United States Patent [19]

Gouzard et al.

[11] Patent Number: 4,956,322
[45] Date of Patent: Sep. 11, 1990

[54] IMPROVEMENTS TO SOLID GRANULAR CATALYSTS, PROCESS FOR THEIR PREPARATION

[75] Inventors: Jean P. Gouzard, Rueil-Malmaison; Georges Szabo, Montivilliers, both of France

[73] Assignee: Compagnie de Raffinage et de Distribution Total France, Levallois-Perret, France

[21] Appl. No.: 255,709

[22] Filed: Oct. 7, 1988

[30] Foreign Application Priority Data

Oct. 7, 1987 [FR] France .................... 87 13846

[51] Int. Cl.⁵ .................... B01J 29/06; B01J 37/02
[52] U.S. Cl. .................... 502/62; 502/10
[58] Field of Search .................... 502/62, 8, 10

[56] References Cited

U.S. PATENT DOCUMENTS

| 2,885,368 | 5/1959 | Hess et al. | 502/62 |
| 3,453,217 | 7/1969 | Kozlowski | 502/150 |
| 3,563,912 | 2/1971 | Young | 502/62 |
| 3,720,627 | 3/1973 | Jarvis | 502/150 |
| 3,849,334 | 11/1974 | Frielingsdorf | 502/105 |

FOREIGN PATENT DOCUMENTS

| 937047 | 6/1956 | Fed. Rep. of Germany . |
| 802536 | 3/1936 | France . |
| 2163584 | 12/1972 | France . |
| 61371 | 7/1970 | Luxembourg . |

Primary Examiner—Carl F. Dees
Attorney, Agent, or Firm—A. Thomas S. Safford

[57] ABSTRACT

The invention relates to a solid granular catalyst subject to degradation by exposure to humidity and/or oxygen, wherein each granule of the catalyst is coated with a continuous and removable protective film of a material that is impermeable to gases and moisture and inert to the constituents of the catalyst.

12 Claims, No Drawings

IMPROVEMENTS TO SOLID GRANULAR CATALYSTS, PROCESS FOR THEIR PREPARATION

The invention relates to improvements to solid granular catalysts, and particularly to catalysts sensitive to humid and/or oxygenous atmospheres. The invention further relates to the preparation of catalysts so improved and to their use in chemical reactions taking place in a controlled atmosphere, such as isomerization and alkylation reactions.

A great many catalysts are susceptible to being transformed and hence altered when in contact with air, and more particularly with humid air. These are generally catalysts with a support composed of refractory materials of adequate specific surface and pore volume which comprise Lewis acid sites or very active metals or sulfides. The supports of these catalysts are usually composed of refractory materials selected from the group consisting of alumina, silica, the aluminosilicates, the zeolites, magnesia, zirconia, the oxides of gallium, titanium, thorium and boron, or mixtures of these oxides, with a specific surface ranging from 15 to 1,000 $m^2$ per gram, and preferably from 100 to 350 $m^2$ per gram, and a specific pore volume exceeding 0.02 $cm^3$ per gram.

The catalysts with Lewis acid sites include catalysts of the Friedel-Craft type based on $AlCl_3$ or $AlBr_3$ and others which are extremely sensitive to the humidity and oxygen in the air, as well as other commercial halogenated catalysts, but also $BF_3$-based catalysts, such as the catalyst employed in the benzene alkylation process. Other catalysts, such as Raney nickel catalysts or catalysts based on phosphorus sulfides, are also sensitive to humid and oxygenous atmospheres.

The manufacture, handling and storage of these catalysts, as well as the operations of charging and discharging the industrial units which use them in large quantities, are very difficult as it is always necessary to work in a controlled atmosphere that is inert to the catalyst. The cost of these operations in a controlled atmosphere adds to the cost of the catalyst to the user.

The present invention seeks to overcome these drawbacks by providing improvements to such granular catalysts so as to permit their handling, storage and charging to reactors in open air, even in the presence of humidity. "Granular catalyst" here means any catalyst, whether extruded or not, in cylindrical, spherical, multilobed or any other form visible under the microscope.

The invention further provides an improved catalyst that can be readily prepared and costs substantially less to make than a catalyst not so improved.

To this end, the invention has as an embodiment a solid granular catalyst characterized in that each of its granules is coated with a continuous and removable protective film of a material that is impermeable to gases and moisture and inert to the constituents of the catalyst.

The invention has as a further embodiment a process for the preparation of such a solid granular catalyst that is characterized in that each granule of the catalyst is coated with a continuous and removable protective film of a material that is impermeable to gases and moisture and inert to the catalyst.

In accordance with the invention, each catalyst granule thus is insulated from the ambient atmosphere by a film which prevents the passage of agents aggressive to the catalyst, said film consisting of a material which itself is inert to the constituents of the catalyst.

To be able to withstand handling, the material forming the film should have impact resistance and should not be tacky so that the film will be free of any porosity or cracks that would promote the passage of agents aggressive to the catalyst when granules sticking together separate. To this end, the sticking temperature of the film, and particularly of the individually coated granules, is preferably above 40° C. Moreover, the film-forming material should be readily removable after the catalyst has been charged to an industrial unit during the initial operating phase of the unit without interfering with the activity of the catalyst or with the chemical reaction promoted by the catalyst.

The material forming the film which coats the catalyst granules may be deposited thereon in the molten state, for example, to be solidified thereon by cooling.

For the coating of the catalyst granules, any system may be employed which permits the liquid, hot coating material to be sprayed onto the cold immobile or moving granules in a controlled atmosphere, or to immerse the granules in a bath of the coating material in the liquid state. The granules may then be cooled by moving them from a hot zone to a cold zone, or by effecting a rapid cooling of the enclosure containing them.

The catalyst granules may also be coated by preheating them and bringing them while hot and in motion into contact with solid particles of the coating material, dispersed by any conventional means, for example, by fluidization.

For the melting and/or rapid solidification of the material forming the coating film for the catalyst granules, the necessary difference in temperature between the granules and the coating material, or between the hot and cold zones of the treating enclosure, may range from 1 to 100° C., and preferably from 20 to 80° C.

The film which coats the catalyst granules may be removed, before or during the chemical reactions in which the catalyst participates, by being melted and/or by being dissolved in a fluid solvent.

In accordance with the invention, the material forming the coating film may have a melting point of 120° C. or less, as determined by the method of French standard AFNOR NFT 60114.

In a preferred embodiment of the invention, the material forming the film which coats the catalyst granules is selected from the group consisting of saturated hydrocarbons which are solid at 20° C., such as microcrystalline waxes, or paraffins rendered microcrystalline by doping with an additive.

More particularly, said material may consist in whole or in part of a saturated hydrocarbon that is solid at 20° C., selected from the group consisting of paraffins and waxes with a melting point of between 40 and 120° C., and preferably between 50 and 80° C., as determined in conformity with standard AFNOR NFT 60114.

To render these paraffins and waxes microcrystalline when they are not microcrystalline by nature and to thus enhance their film-forming and plasticizing properties, in other words, their homogeneity and their impact resistance during the handling of the catalyst granules (storage and charging of the reactors), the material forming the film may further incorporate from 0 to 20 percent by weight, and preferably from 5 to 10 percent by weight, of at least one additive selected from the group consisting of the waxes of alkylene polymers, and particularly polyethylene waxes with a molecular weight ranging from 500 to 10,000, and preferably from 1,500 to 6,000. A film so produced will be continuous and free of cracks, and hence impermeable to humid air.

The protective film should, of course, not only insulate the catalyst from an atmosphere destructive of its acid sites but also should not react with the latter. To be inert to the coated catalyst, the film-forming material should, for example, be freed of molecules reacting with the catalyst. The paraffins and waxes generally have a water content ranging from 100 to 300 ppm and an aromatic hydrocarbon content that may be as high as 1 percent by weight. These compounds react strongly with certain active sites, for example, the Lewis acids, of the catalysts to be coated. In particular, it is known that aluminum chloride, $AlCl_3$, and boron trifluoride, $BF_3$, which are the acid sites present in some catalysts, will hydrolyze in the presence of moisture and form complexes with the aromatic hydrocarbons.

For these paraffins and waxes to be usable under the present invention, it will therefore be necessary to dehydrate and dearomatize them. As is known in the art, they can be melted in the presence of a conventional dehydrating agent under an inert nonoxidizing atmosphere. A comparable treatment of these paraffins and waxes with aluminum chloride, $AlCl_3$, offers the dual advantage of removing both the water and the aromatic hydrocarbons in one operation.

The film which coats the catalyst granules is preferably thin and may advantageously have a thickness of between 0.01 and 1 mm.

The weight of the film-forming material may represent from 0.1 to 10 percent, and preferably from 0.5 to 5 percent, of the total weight of the catalyst granules coated with the film.

The catalyst of the invention may comprise, for example, a support selected from the group consisting of alumina, silica, the aluminosilicates, the zeolites, magnesia, zirconia, the oxides of gallium, titanium, thorium and boron, or a mixture of these oxides, and at least one active compound selected from the group consisting of Lewis acids, and particularly $AlCl_3$ and $BF_3$, hydrolyzable metals, and phosphoric sulfides.

The invention has as a further embodiment the use of the catalysts defined above in chemical reactions taking place in a controlled and preferably nonhumid and/or nonoxygenous atmosphere, and particularly the reactions of isomerization of normal-paraffins from $C_4$ to $C_8$ and of alkylation of olefinic and aromatic hydrocarbons.

The catalysts of the invention may be handled in a humid and/or oxygenous atmosphere prior to use in a chemical reaction. That is, they may be so stored and then charged to the reactor in which the chemical reaction will take place. After the atmosphere in the reactor has been rendered inert to the uncoated catalyst, the film coating the catalyst is removed by the melting and flowing off of the film-forming material at a temperature of between 40 and 120° C.

The melting of the film may be brought about by passing a hot liquid or gaseous fluid through the bed formed by the coated catalyst granules. This hot fluid may be a gas taking part in the catalyzed reaction before the feedstock is introduced and the catalytic reaction is started, or it may the feedstock itself. Another alternative for removing the film in accordance with the invention is its dissolution in a fluid solvent, which may be a liquid or a gas, followed by its entrainment through the entire catalyst bed or a portion thereof. The solvent may be the feedstock introduced into the reactor.

The example which follows will serve to illustrate the invention without limiting it in any way.

EXAMPLE

This example demonstrates the effectiveness of the protection obtained by coating granules of a catalyst which is sensitive to oxygenous and humid atmospheres with a film that is tight and impermeable to gaseous fluids and that does not have any effect on the reactivity of the catalyst.

The catalyst used, A, was a catalyst suitable for the isomerization of n-paraffins from $C_4$ to $C_7$. The characteristics of this catalyst are given in Table 1 which follows:

TABLE 1

| Support | Ketjen alumina, reference CK 300 Specific surface: 189 $m^2/g$ |
|---|---|
| Elements present on the support (wt. %) | Pt: 0.33 wt. % |
| | Zr: 0.16 wt. % |
| | Cl: 3.5 wt. % |
| | (= 5 wt. % of $AlCl_3$ on the support) |

Catalyst A was to be coated with a film consisting of a dehydrated paraffin doped with 7% of a polyethylene wax with a molecular weight of between 1,500 and 6,000, the melting point of this material being 65° C.

1. Preparation of the paraffin

To dehydrate the paraffin, the applicants caused it to melt in the presence of several dehydrating agents. The effectiveness of these treatments is apparent from Table 2 below, which gives the water contents of the paraffin after treatment. The water contents were determined by the Karl Fischer method in conformity with French standard AFNOR NFT 60-1564.

TABLE 2

| Dehydrating agent | $H_2O$ content, ppm |
|---|---|
| None | 200 |
| 3 Å screen | <1 |
| $AlCl_3$ | 3 |
| Dry $N_2$' stripping | <1 |

Finally, an $AlCl_3$-treated paraffin wax was used as the coating material for catalyst A since this dehydrating treatment further permits the removal by complex formation of the aromatic hydrocarbon molecules present in the paraffin as impurities that might react with the $AlCl_3$ present in catalyst A.

2. Coating of catalyst A

A glass tube was used which was adapted to be stoppered while being flushed with an inert gas, which in this case was dry nitrogen. The material pretreated with $AlCl_3$ which was to be used as coating film was filled into the test tube, followed by a basket of stainless-steel gauze containing the granules of catalyst A under a dry nitrogen atmosphere. The film-forming material was melted by heating the tube with a and heater wrapped around it, and the basket containing the catalyst granules was dipped into the molten material and then slowly raised. Repeated several times, this procedure resulted in a coating of uniform appearance. The mass of coated catalyst was exposed to the air and then introduced into the isomerization reactor.

3. Removal of coating film and start of isomerization reaction

The reactor containing the catalyst granules was flushed with a stream of hydrogen and then heated to 150° C. As the temperature reached 65° C., the coating film began to melt and to flow through the catalyst bed. When the molten film had been removed, the n-pentane forming the feedstock was introduced into the reactor.

4. Catalytic performance

The performance of the catalyst, both coated and uncoated, was determined during the isomerization reaction of the n-pentane under the following conditions:

Quantity of catalyst: 13 cm$^3$ (8.6 g)
Composition of feedstock:
  n-pentane: 96.01 wt. %
  isopentane: 2.90 wt. %
  2-methylpentane: 1.09 wt. %
Flowrate of feedstream: 61.8 cm$^3$/hr., corresponding to a weight-hourly space velocity (weight of feedstream per hour per unit weight of catalyst), or WHSX
Flowrate of H$_2$: 38.7 liters/hour, corresponding to an H$_2$/hydrocarbon ratio of 3.0
Total pressure: 30·10$^5$ pascals (30 bars)
Temperature: 150° C.
The feedstock was doped with 300 ppm of dichloropropane The results of the tests are presented in Table 3 which follows.

TABLE 3

| Catalyst | Percent conversion nC$_5$ | Percent isomerization |
|---|---|---|
| Uncoated: | | |
| Not exposed to air | 70.21 | 100 |
| Exposed to air | 1 | 100 |
| Coated, exposed to air | 63.0 | 100 |

These results show that the coated catalyst retains its catalytic activity when exposed to air while the uncoated catalyst is inactivated upon exposure to air.

This application is based on the French priority application no. 87.13846, filed Oct. 7, 1987, which is incorporated herein.

We claim:

1. A solid granular catalyst comprising catalyst granules coated with a continuous removable protective film of a material that is impermeable to gases and moisture and inert to the constituents of said catalyst, said protective film comprising a mixture of at least one saturated hydrocarbon having a melting point of 40° C. to 120° C. and an alkylene polymer wax present in said mixture in an amount of up to 20% by weight of said mixture.

2. A solid granular catalyst comprising catalyst granules coated with a continuous removable protective film of a material that is impermeable to gases and moisture and inert to the constitutes of said catalyst, said protective film comprising a mixture of from 95% to 90% by weight of at least one saturated hydrocarbon having a melting point of 40° C. to 120° C. and from 5% to 10% by weight of a polyethylene wax having a molecular weight of 500 to 10,000.

3. A catalyst as defined in claim 2, wherein the material forming the protective film is anhydrous and free of aromatic hydrocarbons.

4. A catalyst as defined in claim 2, wherein the protective film has a thickness of between 0.01 and 1 mm.

5. A catalyst as defined in claim 2, wherein the material forming the protective film represents from 0.1 to 10 percent of the total weight of the coated catalyst granules.

6. A catalyst as defined in claim 2, wherein the protective film has a thickness of between 0.01 and 1 mm, and the material forming the protective film represents from 0.5 to 5 percent of the total weight of the coated catalyst granules.

7. A catalyst as defined in claim 2, comprising a support selected from the group consisting of alumina, silica, the aluminosilicates, the zeolites, magnesia zirconia, the oxides of gallium, titanium, thorium and boron, or a mixture of these oxides, and at least one active compound selected from the group consisting of Lewis acids, hydrolyzable metals, and pyrophoric sulfides.

8. A process for the preparation of a protected solid granular catalyst which is adversely affected by moisture and oxygen when unprotected, comprising coating the catalyst granules with a continuous and removable film of a material that is impermeable to gases and moisture and inert to the catalyst, said protective film comprising a mixture of 95% to 90% by weight of at least one saturated hydrocarbon having a melting point of 40° C. to 120° C. and from 5% to 10% by weight of a polyethylene wax having a molecular weight of 500 to 10,000.

9. A process as defined in claim 8, wherein the coating of each granule is obtained by the melting, solidification, or melting and solidification of the film-forming material on the surface of the granules.

10. A process as defined in claim 8, wherein the melting, solidification, or melting and solidification of the film-forming material are obtained through a temperature difference between the granules and the film-forming material, or between the hot and cold zones of the treating enclosure, ranging from 1 to 100° C.

11. A process as defined in claim 9, wherein the melting, solidification, or melting and solidification of the film-forming material are obtained through a temperature difference between the granules and the film-forming material, or between the hot and cold zones of the treating enclosure, ranging from 20 to 80° C.

12. A process as defined in claim 8, wherein the material used for forming the protective film is rendered anhydrous and freed of aromatic hydrocarbons by treatment with aluminum chloride, AlCl$_3$, prior to coating the catalyst granules.

* * * * *